United States Patent
Kochi et al.

(10) Patent No.: US 8,794,451 B2
(45) Date of Patent: Aug. 5, 2014

(54) HOLLOW-FIBER ULTRAFILTRATION MEMBRANE WITH EXCELLENT FOULING RESISTANCE

(75) Inventors: Kenta Kochi, Ohtsu (JP); Tsuyoshi Hoshiyama, Iwakuni (JP); Hideki Sugihara, Ohtsu (JP); Akihiro Ariji, Ohtsu (JP); Koichi Baba, Iwakuni (JP); Hideki Yamada, Osaka (JP)

(73) Assignee: Toyo Boseki Kabushiki Kaisha, Osaka-shi (JP)

( * ) Notice: Subject to any disclaimer, the term of this patent is extended or adjusted under 35 U.S.C. 154(b) by 502 days.

(21) Appl. No.: 12/860,242

(22) Filed: Aug. 20, 2010

(65) Prior Publication Data
US 2011/0017660 A1   Jan. 27, 2011

Related U.S. Application Data

(63) Continuation-in-part of application No. PCT/JP2009/052950, filed on Feb. 20, 2009.

(30) Foreign Application Priority Data

Feb. 21, 2008   (JP) ................................. 2008-039550

(51) Int. Cl.
| | |
|---|---|
| B01D 33/21 | (2006.01) |
| B01D 39/00 | (2006.01) |
| B01D 63/06 | (2006.01) |
| B01D 67/00 | (2006.01) |
| B01D 39/14 | (2006.01) |
| B01D 71/28 | (2006.01) |
| B01D 71/68 | (2006.01) |
| B01D 69/08 | (2006.01) |
| B01D 61/00 | (2006.01) |

(52) U.S. Cl.
CPC ............... B01D 71/68 (2013.01); B01D 69/08 (2013.01); B01D 71/28 (2013.01)
USPC ............ 210/500.23; 210/500.41; 210/500.42; 210/650

(58) Field of Classification Search
CPC ......... B01D 71/68; B01D 69/08; B01D 71/28
USPC ................. 210/650, 500.41, 500.42, 500.27, 210/500.29, 321.8, 500.23; 428/221; 264/345, 49, 178 R, 189
See application file for complete search history.

(56) References Cited

U.S. PATENT DOCUMENTS

| | | | |
|---|---|---|---|
| 4,051,300 A * | 9/1977 | Klein et al. ................... | 428/398 |
| 5,683,916 A * | 11/1997 | Goffe et al. ................... | 436/535 |
| 5,989,426 A | 11/1999 | Hirose et al. | |
| 6,413,425 B1 * | 7/2002 | Hachisuka et al. ...... | 210/500.38 |

(Continued)

FOREIGN PATENT DOCUMENTS

| | | |
|---|---|---|
| JP | 7-090154 B2 | 10/1995 |
| JP | 09-019630 A | 1/1997 |

(Continued)

OTHER PUBLICATIONS

International Search Report of PCT/JP2009/052950, mailing date of Apr. 7, 2009.

*Primary Examiner* — Ana Fortuna
(74) *Attorney, Agent, or Firm* — Westerman, Hattori, Daniels & Adrian, LLP (57) ABSTRACT

An object of the present invention is to provide a hollow-fiber ultrafiltration membrane that can be used in treatment in various aqueous fluids such as water purification, beverage treatment, seawater clarification, and that has excellent fractionation characteristics and permeability, while deterioration of its performance due to passage of time is minimized, and that has excellent recovery of the membrane-separation characteristics by cleaning. The main feature of the hollow-fiber ultrafiltration membrane of the present invention is that the specific surface area of the membrane surface to which raw water is supplied falls within the range from not less than 1.10 to not greater than 1.55. The present invention also provides a process for producing a hollow-fiber ultrafiltration membrane, wherein a heat treatment is conducted under the condition that the membrane having a residual organic solvent content of not greater than 300 mg/g.

8 Claims, 3 Drawing Sheets

(56) References Cited

U.S. PATENT DOCUMENTS

| | | |
|---|---|---|
| 2005/0121386 A1* | 6/2005 | Yamada et al. .......... 210/500.35 |
| 2007/0199891 A1* | 8/2007 | Mabuchi et al. ......... 210/500.23 |
| 2009/0078641 A1* | 3/2009 | Monden et al. ............ 210/321.6 |
| 2009/0110900 A1 | 4/2009 | Yokota et al. |
| 2010/0219122 A1* | 9/2010 | Ogawa et al. ............ 210/500.23 |
| 2011/0017660 A1* | 1/2011 | Kochi et al. .............. 210/500.23 |
| 2011/0259816 A1* | 10/2011 | Yokota et al. ............ 210/500.23 |

FOREIGN PATENT DOCUMENTS

| | | | |
|---|---|---|---|
| JP | 11-179176 A | | 7/1999 |
| JP | 3216910 B2 | | 10/2001 |
| JP | 2003-245526 A | | 9/2003 |
| JP | 3594946 B2 | | 12/2004 |
| JP | 2005-087945 A | | 4/2005 |
| JP | 2005-169332 A | | 6/2005 |
| JP | 2006-239576 A | | 9/2006 |
| JP | 2007-289886 A | | 11/2007 |
| JP | 2007289886 | * | 11/2007 |
| JP | 2008-018231 A | | 1/2008 |
| JP | 2008-155009 A | | 7/2008 |
| JP | 2008-194647 A | | 8/2008 |
| JP | 2008-207153 A | | 9/2008 |
| WO | 2007/102528 | * | 9/2007 |

* cited by examiner

HOLLOW-FIBER ULTRAFILTRATION MEMBRANE WITH EXCELLENT FOULING RESISTANCE

TECHNICAL FIELD

The present invention relates to a hollow-fiber ultrafiltration membrane that is used to remove mainly bacteria, viruses, suspended solids (SS) components and the like from water. Specifically, the present invention relates to a hollow-fiber ultrafiltration membrane having an excellent anti-fouling performance. More specifically, the present invention relates to a hollow-fiber ultrafiltration membrane exhibiting excellent membrane performance for a long period of time, and remarkable recovery of its membrane performance by cleaning.

BACKGROUND ART

There are several types of hollow-fiber membranes for use in treating water, such as microfiltration membranes, ultrafiltration membranes, nanofiltration membranes, and reverse osmosis membranes. These hollow-fiber membranes are widely used for treating drinking water, sewage water, drain water and the like. Examples of the materials for the hollow-fiber membranes include polyethylene, polypropylene, polyvinylidene fluoride, polysulfone, polyether sulfone, polyacrylonitrile, polyamide, cellulose, cellulose acetate, etc.

The following are examples of the basic properties required for hollow-fiber ultrafiltration membranes that are used for membrane separation.

(1) Excellent performance in removing target substances.
(2) High permeability relative to the substances that are to be passed through.

(Hereunder, the combined properties of (1) and (2) are referred to as fractionation characteristics.)

(3) High permeability relative to the fluid to be treated (permeability).

(Hereunder, the combined properties of (1), (2) and (3) are referred to as membrane separation characteristics.)

(4) Sufficient strength to resist breaking or leaking (strength).
(5) Fractionation characteristics that resist a decrease over time (retention of fractionation characteristics).
(6) Permeability relative to the fluid to be treated that resists a decrease over time (retention of permeability).

(Hereunder, the combined properties of (5) and (6) are referred to as retention of membrane separation characteristics.)

In addition to the above properties, separation membranes, other than disposable membranes, such as those used for artificial dialysis, are required to have the following properties.

(7) Excellent recovery of fractionation characteristics by cleaning (recovery of fractionation characteristics).
(8) Excellent recovery of permeability by cleaning (recovery of permeability).

(Hereunder, the combined properties of (7) and (8) are referred to as recovery of membrane separation characteristics.)

In the filtration operation of drinking water production, wherein tap water is produced by purifying fresh water, such as river water, lake water, ground water, etc., sand filtration or a combination of coagulation sedimentation and sand filtration has conventionally been employed as the filtration process. However, due to concerns about contaminating water sources with cryptosporidium, which is highly resistant to chlorine and may not be completely detoxified by sterilization using chlorine after filtration, there is currently an increasing tendency for membrane filtration techniques that more easily and reliably remove contaminants to be used either singly or in combination with other techniques, such as coagulation sedimentation and sand filtration. In the desalination of seawater using a reverse osmosis membrane as well, the seawater that is to be supplied to the reverse osmosis membrane is subjected to coagulation sedimentation, sand filtration or like pre-treatment (clarification process) to remove contaminants in advance, and then supplied to the reverse osmosis membrane to be desalinated. Here too, there is a tendency for contaminants to be removed by employing membrane filtration rather than coagulation sedimentation and sand filtration, or by combining membrane filtration with other techniques.

As time passes in a membrane filtration process, fouling substances adhere to and are deposited onto the membrane surface on the side to which raw water is supplied. This increases membrane filtration resistance and lowers the filtration efficiency. When this occurs, the fouling substances adhering to the membrane surface are removed by back washing, air scrubbing, feed water draining, chemical cleaning or a like cleaning operation to decrease the membrane filtration resistance. Thereafter, the membrane filtration is re-started. The membrane filtration process proceeds by alternately repeating the membrane filtration operation and cleaning operation. In the cleaning operation, electricity, water and other utilities are necessary, and water production is halted during the operation; therefore, it is preferable that the required cleaning operation frequency be as low as possible, and that the time necessary for the cleaning operation be as short as possible. This makes it highly advantageous to obtain a separation membrane that has little increase in membrane filtration resistance as time passes in the membrane filtration operation, and that greatly decreases the membrane filtration resistance by conducting a cleaning operation.

In prior art techniques, various techniques have been developed in order to suppress the increase in filtration resistance during the membrane filtration operation by hydrophilizing the membrane surface to enhance its anti-fouling property. One example of such a technique is the addition of polyvinyl pyrrolidone (PVP), polyvinyl alcohol (PVA) or a like hydrophilic polymer to the stock solution that is used to produce a porous membrane formed of a hydrophobic polymer. This allows the hydrophilic polymers remaining in the formed membrane to increase the hydrophilicity of the membrane surface, thus enhancing its anti-fouling property. This is an excellent method in that membranes can be easily obtained with high productivity. However, a satisfactory anti-fouling property has not been attained.

In other prior art techniques, a membrane of a hydrophobic polymer is formed first, and the membrane is then subjected to various surface treatments to cover the surface of the hydrophobic polymer membrane with a hydrophilic polymer so as to enhance the anti-fouling property. These methods are more complicated than the method in which membranes are produced by adding a hydrophilic polymer to a membrane-production stock solution. Furthermore, the process control is difficult in these methods, resulting in numerous problems for practical use.

Both of the above-described types of prior art techniques are based on the technical concept of focusing on the chemical properties and chemical constituents of the membrane surface, and enhancing the anti-fouling property by hydrophilizing the membrane surface. Unlike the techniques described above, Patent Document 5 and Patent Document 6 consider the relationship between the shape of the membrane surface and the membrane separation characteristics. Patent Document 5 discloses an invention regarding a composite reverse osmotic membrane comprising a polyamide-based skin layer. Patent Document 5 also discloses that permeability can be improved by setting the specific surface area of the membrane surface on the side to which raw water is supplied to within a specific range. Patent Document 6 also discloses an invention regarding a composite reverse osmotic membrane comprising a polyamide-based skin layer. In the composite reverse osmotic membrane of Patent Document 6, when the average horizontal distance between the adjacent tops of the asperities on the surface to which the raw water is supplied is defined as X and the average difference between the adjacent tops and bottoms of the asperities is defined as Y, a high blocking performance can be obtained when X and Y satisfy a specific relationship. However, both Patent Document 5 and Patent Document 6 consider composite reverse osmotic membranes and do not teach any improvement in the anti-fouling property.

Patent Document 1: Japanese Examined Patent Publication No. 1995-090154
Patent Document 2: Japanese Patent No. 3594946
Patent Document 3: Japanese Patent No. 3216910
Patent Document 4: Japanese Unexamined Patent Publication No. 1999-179176
Patent Document 5: Japanese Unexamined Patent Publication No. 1997-19630
Patent Document 6: Japanese Unexamined Patent Publication No. 2005-169332

DISCLOSURE OF THE INVENTION

Problem to Be Solved by the Invention

An object of the present invention is to provide a hollow-fiber ultrafiltration membrane that can be used in various aqueous fluid treatments, such as water purification, beverage treatment, and seawater clarification. The target hollow-fiber ultrafiltration membrane has excellent fractionation characteristics and permeability, and exhibits little decrease in performance with the passage of time and excellent recovery of the membrane separation characteristics by cleaning.

Means for Solving the Problem

The present inventors made various hollow-fiber ultrafiltration membranes having a smooth membrane surface on the side to which raw water is supplied, and studied the relationship between the smoothness of the membrane surface and the retention and recovery of membrane separation characteristics. This was based on the idea that making the membrane surface smooth on the side to which raw water is supplied will decrease the contact area between the membrane surface and the fouling substance, thus decreasing the physical binding power between the fouling substance and the membrane surface and lowering the adhesion of the fouling substance to the membrane surface, thereby enabling the fouling substance adhering to the membrane surface to be easily peeled off. As a result, the following invention was completed.

(1) A hollow-fiber ultrafiltration membrane having a specific surface area of not less than 1.10 and not greater than 1.55 with respect to the membrane surface on the side to which raw water is supplied.

(2) The hollow-fiber ultrafiltration membrane according to Item (1), which comprises hydrophobic and hydrophilic polymers.

(3) The hollow-fiber ultrafiltration membrane according to Item (2), wherein the hydrophobic polymer contains polysulfone-based resin.

(4) The hollow-fiber ultrafiltration membrane according to Item (2) or (3), wherein the hydrophilic polymer contains polyvinyl pyrrolidone.

(5) The hollow-fiber ultrafiltration membrane according to any one of Items (1) to (4), which has a pure water permeation rate of 5 to 300 m/d/100 kPa when measured at 25° C.

(6) The hollow-fiber ultrafiltration membrane according to any one of Items (1) to (5), which has a removal ratio of at least 70% for polyethylene glycol having a molecular weight of 200,000.

(7) The hollow-fiber ultrafiltration membrane according to any one of Items (1) to (6), which is used for membrane filtration of surface water, ground water, lake water or seawater.

(8) A method for producing the hollow-fiber ultrafiltration membrane of any one of Items (1) to (7), comprising a step of conducting a heat treatment under the condition that the membrane has a residual organic solvent content of not greater than 300 mg/g.

Effect of the Invention

The present invention provides a hollow-fiber ultrafiltration membrane that exhibits excellent retention and recovery of its membrane separation characteristics. The hollow-fiber ultrafiltration membrane of the present invention can be used in various aqueous fluid treatments, as a water-purification membrane, beverage-treatment membrane, seawater-clarification membrane, etc. The hollow-fiber ultrafiltration membrane of the present invention is particularly desirable for use in water purification. The hollow-fiber ultrafiltration membrane of the present invention exhibits excellent fractionation characteristics and permeability, as well as a satisfactory membrane strength that resists breaking and/or leaking during module molding and in actual usage. The hollow-fiber ultrafiltration membrane of the present invention also suppresses decreases in the aforementioned characteristics with the passage of time, and exhibits excellent recovery of its membrane separation characteristics.

BEST MODE FOR CARRYING OUT THE INVENTION

Because the smoothness of the membrane surface on the side to which raw water is supplied is controlled within the appropriate range, the hollow-fiber ultrafiltration membrane of the present invention possesses excellent fractionation characteristics and permeability, and it exhibits, at the same time, a high recovery of membrane separation characteristics when subjected to back-wash cleaning (hereunder referred to as back washing). When river water, lake water, well water or the like is treated by membrane filtration, a phenomenon is observed in which water permeability is reduced as time passes. This is because the fouling substances contained in the raw water adhere to the pores or to the membrane surface and increase the water permeation resistance. In order to cope with such a phenomenon, back washing is generally conducted periodically to recover the water permeability. Fouling substances can be roughly divided into two groups with respect to size. Larger fouling substances have a particle diameter of approximately submicron level to several tens of μm, and smaller fouling substances have a particle diameter of 10 nm to several tens of nm. Among fouling substances, those having a larger size are silt, algae, etc., and those having a smaller size contain many organic components such as humin. When the shape and size of the outer surface of the fouling substance is similar to those of the asperities of the separation membrane surface, the contact area between the fouling substance and the membrane surface becomes large, resulting in the increase in adhesion. This makes it difficult to peel the adhering fouling substance from the membrane surface by back washing. More specifically, a separation membrane having asperities on the membrane surface with a shape and size that differ from those of the fouling substances can potentially exhibit excellent recovery of the membrane separation characteristics. A membrane having a rough surface with asperities larger than the larger fouling substances, i.e., those having a particle diameter of approximately submicron level to several tens of μm, is not preferable because the roughness of such membrane surface substantially depends on the pore size, and fouling substances are able to reach the inside of the pores and they clog the separation membrane. In contrast, when a membrane has a highly smooth surface, i.e., when it has far smaller asperities than the size of smaller fouling substances, the adhesion of the fouling substances is suppressed and the recovery of the membrane separation characteristics by back washing is excellent. However, in such a membrane, the porosity of the membrane surface is very low or the pore radius is extremely small. This results in insufficient permeability, making such a membrane impractical.

JIS B0601-1994 describes detailed parameters for indicating surface roughness, wherein the arithmetical-mean roughness Ra' in a roughness curve, the ten-spot average roughness Rz' and the like are used as indices. For example, arithmetical-mean roughness Ra' is defined by Formula (1) below, wherein reference length L is cut in the mean line direction from a roughness curve, the mean line direction of the cut portion is defined as the X axis, and the roughness curve is expressed by function Z(X).

Formula 1

$$Ra' = \frac{1}{L}\int_0^L Z(X)\,dX \quad (1)$$

The surface roughness of the separation membrane can be measured using an atomic force microscope (hereunder referred to as AFM). The arithmetical-mean surface roughness Ra measured and calculated using an AFM is three-dimensionally expanded to apply the arithmetical-mean roughness Ra' of the roughness curve defined by JIS B 0601-1994 to the measured surface. In the hollow-fiber ultrafiltration membrane of the present invention, it is preferable that the arithmetical-mean surface roughness Ra of the membrane surface on the side to which raw water is supplied be not less than 5 nm and not greater than 17 nm, more preferably not less than 6 nm and not greater than 16 nm, and still more preferably not less than 7 nm and not greater than 15 nm. When the arithmetical-mean surface roughness Ra is less than 5 nm, practically satisfactory permeability relative to the fluid to be treated cannot be obtained. When it is greater than 17 nm, the recovery of the membrane separation characteristics by back washing becomes extremely poor, causing the speed of differential pressure increase to become remarkably high during membrane separation operation even when it is combined with back washing, and making such a membrane not practically usable.

However, even when the arithmetical-mean surface roughness Ra falls within the range of not less than 5 nm to not greater than 17 nm, the separation membrane does not always have satisfactory smoothness. The reason for this lies in the definition of the arithmetical-mean surface roughness Ra. The arithmetical-mean surface roughness Ra depends only on the height difference of the roughness curve from the mean surface, and it does not reflect the distances between adjacent peaks or adjacent valleys, i.e., the frequency of the asperities. Therefore, even if the arithmetical-mean surface roughness Ra falls within the range of not less than 5 nm to not greater than 17 nm, when the peak-valley-peak concave portions have a size similar to that of the fouling substances, and such concave portions exist with a high frequency, the fouling substances will easily adhere and be deposited in the concave portions. Such deposited fouling substances cannot be easily removed by back washing, and may greatly lower the recovery of membrane separation characteristics.

Specific surface area (an S ratio) can be used as a parameter that roughly reflects the frequency of the asperities. After conducting extensive research, the present inventors found that there is a strong correlation between the recovery of membrane separation characteristics by back washing and the specific surface area of the membrane surface on the side to which raw water is supplied, and have accomplished the present invention based on this finding. The specific surface area of the present invention is measured using an AFM. When the surface area of the membrane surface is expressed as S and the projected area of the measured surface is expressed as S1, the specific surface area is defined by S/S1. According to its definition, it is easily understandable that the specific surface area is a complex parameter that reflects both the difference in the height of the surface asperities and the frequency of the asperities. In the three-dimensional roughness curve, it is not easy to define and calculate the distance between peaks. Therefore, generally, peaks and valleys are identified in a specific cross section of an AFM-observed surface, and then the distance between the peaks is measured. However, this provides information about only a very limited, single cross section, or requires that complicated measurements be repeatedly conducted to increase the accuracy of the measurement data. Conversely, since specific surface area is a complex parameter as described above, it does not always accurately indicate the frequency of the asperities; however, specific surface area is a very useful parameter because it can be obtained as average information for the entire measured surface and its measurement is easy. The hollow-fiber ultrafiltration membrane of the present invention is characterized in that the specific surface area (S ratio) on the side of the membrane surface to which raw water is supplied is not less than 1.10 and not greater than 1.55, more preferably not less than 1.15, and still more preferably not less than 1.20. However, the specific surface area preferably does not exceed 1.50. When the specific surface area is unduly small, the difference in the height of the membrane surface asperities and the frequency thereof become extremely small. This results in the porosity of the membrane surface being extremely low or the pore radius being extremely small, which makes it impossible to obtain sufficient permeability relative to the fluid to be treated, and renders the membrane impractical. When the specific surface area is unduly large, the difference in the height of the membrane surface asperities and the frequency thereof become large. This makes it easier for fouling substances to adhere to the membrane surface, and tends to reduce the retention and recovery of the membrane separation characteristics, thus causing the speed of differential pressure increase to become remarkably high during membrane separation operation even when it is combined with back washing, and making such a membrane not practically usable.

It is preferable that the hollow-fiber ultrafiltration membrane of the present invention be mainly formed of a hydrophobic polymer so that it can be easily molded into a hollow fiber membrane, and so that the basic requirements for the characteristics of a separation membrane can be easily satisfied. There is no limitation to the hydrophobic polymers as long as they are soluble in a solvent and achieve ultrafiltration performance. Examples thereof include cellulose acetate-based polymers, polysulfone-based polymers, polyamide-based polymers, polyacrylonitrile-based polymers, chemically modified polymers thereof, and mixtures or polymer alloys containing these polymers as main components. Among theses, cellulose acetate-based polymers, polysulfone-based polymers, polyamide-based polymers and polyacrylonitrile-based polymers are preferable because they can relatively easily give the resulting membrane the high permeability and sharp fractionation performance that are required in an ultrafiltration membrane. Due to their high mechanical strength and chemical stability, polysulfone (hereunder referred to as PSf) and polyether sulfone (hereunder referred to as PES) are very preferable, and PES is particularly preferable. These polymer materials may be used singly or in a combination of two or more. When the polymer materials are used in a combination, it is particularly preferable that specific hydrophobic polymers be contained in a proportion of not less than 50 weight %.

It is preferable that the hollow-fiber ultrafiltration membrane of the present invention contain at least one hydrophilic polymer together with at least one hydrophobic polymer. Examples of hydrophilic polymers include polyethylene glycol, polyvinyl alcohol, polyvinyl pyrrolidone, carboxymethyl cellulose, starch and other polymer compounds. Among these, polyvinyl pyrrolidone (hereunder referred to as PVP) is preferable in terms of compatibility with a polysulfone-based polymer, which is the main component of the hollow-fiber ultrafiltration membrane, and because of its proven performance as an aqueous fluid treatment membrane. Hydrophilic polymers may be used singly or in a combination of two or more. When PVP is used as the hydrophilic polymer, PVP having a weight average molecular weight of 10,000 to 1,500,000 is preferably used. It is also possible to use the same or different types of hydrophilic polymer having different molecular weights in combination. As for PVP, K30 (weight average molecular weight of 45,000), K85 (weight average molecular weight of 450,000) and K90 (weight average molecular weight of 1,200,000) sold by Nippon Shokubai Co., Ltd. can be mentioned as preferable examples. Using two types of PVP having weight average molecular weights, as measured by gel permeation chromatography (GPC), that differ from each other by a multiple of two times or more is a preferable example of the use of hydrophilic polymers. Even more preferable is using K30 and K90 in a ratio within the range of 100/0 to 80/20 (K30/K90) to obtain hollow-fiber ultrafiltration membrane that has excellent permeability and fractionation performance.

In the hollow-fiber ultrafiltration membrane of the present invention, raw water may be supplied either to the inner surface or outer surface; however, it is preferable that the raw water be supplied to the inner surface side. In the hollow-fiber ultrafiltration membrane of the present invention, it is preferable that the pore size distribution in the cross sectional direction of the membrane be small-large-small, and the density distribution be high-low-high. It is more preferable for the membrane to have a structure with a dense layer for each of the inner and outer surfaces, wherein the pore size in the inner surface is smaller than that in the outer surface, the porosity initially increases from the inner surface toward the outer surface, and the porosity becomes smaller towards the outer surface after forming at least one extremely large portion.

When raw water is supplied to the inner surface of the membrane, if the membrane has the aforementioned structure, the inner and outer surfaces regulate the fractionation characteristics and permeability in such a way that the fractionation characteristics and permeability are mainly affected by the dense layer on the inner surface side, and subordinately affected by the dense layer on the outer surface side. When raw water is supplied to the inner surface side and treated by cross flow filtration, shear force is generated by the fluid in the vicinity of the inner surface of the membrane, making it easy to prevent fouling substances from being deposited on the membrane surface. In this case, a greater effect can be obtained by disposing a dense layer on the surface. It is advantageous to form the back of the dense layer as a sponge-like supporting layer having a large pore size and large porosity, to reduce fluid resistance and make it easy to obtain high permeability. This structure is also advantageous in that, because the inner surface has a dense layer, fouling substances do not easily enter the membrane and are easily removed by back washing, thus resulting in excellent recovery of membrane separation characteristics. Conversely, a structure with a low-high density distribution is not preferable because clogging by fouling substances will proceed in the inside membrane.

The fluid permeability of the hollow-fiber ultrafiltration membrane of the present invention was evaluated using the pure water permeation rate (FR) as an index. In order to be practically usable as a water purification membrane, beverage treatment membrane and seawater clarification membrane, the pure water permeation rate is preferably not less than 5 m/d/100 kPa, more preferably 10 m/d/100 kPa, and still more preferably 20 m/d/100 kPa. There is no particular upper limit; however, in order to attain both excellent permeability relative to the fluid to be treated and practically usable membrane strength and fractionation characteristics, the pure water permeation rate is preferably not greater than 300 m/d/100 kPa, more preferably not greater than 200 m/d/100 kPa, still more preferably not greater than 100 m/d/100 kPa, and even more preferably not greater than 50 m/d/100 kPa.

In the present invention, a differential pressure increase rate is used as an index to evaluate the decrease in permeability relative to the fluid to be treated as time passes and the degree of the permeability recovery that is achieved by washing; the differential pressure increase rate is determined when a specific simulated raw water, into which humic acid has been dissolved, is treated under specific membrane filtration conditions. The specific operating conditions are described later. The specific membrane filtration conditions are such that membrane filtration at a specific flux is continuously conducted for a predetermined period, back washing at a specific flux is then performed and such operation is repeatedly conducted, and the degree of increase in the differential pressure relative to the filtration time is evaluated. The differential pressure increase rate is an index that can evaluate both the decrease in permeability relative to the treated fluid over time (the retention of permeability relative to the treated fluid) when back washing is not conducted, and the permeability recovery (the recovery of permeability relative to the treated fluid) that is achieved by back washing. Therefore, it reflects the retention and the recovery of permeability relative to a fluid in actual membrane filtration operation. In order to be practically usable as a water purification membrane, a beverage treatment membrane, and a seawater clarification membrane, the differential pressure increase rate is preferably not greater than 0.50 kPa/hr, more preferably not greater than 0.30 kPa/hr, and even more preferably not greater than 0.20 kPa/hr. There is not particular lower limit; however, when the differential pressure increase rate is a negative value, it is highly possible that the pore size in the separation membrane is unduly large or the separation membrane is damaged.

Before and after evaluating the differential pressure increase rate, the removal ratio of polyethylene glycol 200,000 (RjPEG200K) was measured. RjPEG200K is an alternative index for indicating a molecular-weight cutoff. RjPEG200K of 70% corresponds to a molecular-weight cutoff of about 150,000. When the hollow-fiber ultrafiltration membrane is used as a water purification membrane or a seawater clarification membrane, it is preferable that the RjPEG200K be not less than 70%.

The RjPEG200K rate of change is calculated by dividing the absolute value of the RjPEG200K change by the RjPEG200K before the differential pressure increase rate is evaluated. The thus obtained RjPEG200K rate of change is used as an index for a combined evaluation of the change in the fractionation characteristics over time in the filtration operation when back washing is not conducted (the retention of fractionation characteristics) and the degree of recovery of the fractionation characteristics that is achieved by back washing (the recovery of fractionation characteristics). The smaller the RjPEG200K rate of change, the better. The RjPEG200K rate of change is preferably not greater than 10%, more preferably not greater than 5%, and still more preferably not greater than 3%. A large RjPEG200K rate of change indicates that the fractionation characteristics have greatly changed during the membrane filtration operation.

The hollow-fiber ultrafiltration membrane of the present invention preferably comprises an ultrafiltration membrane, wherein the pore diameter in the surface to which raw water is supplied is preferably 0.001 μm to 0.1 μm, and more preferably 0.01 μm to 0.07 μm. When the pore diameter is smaller than that range, the permeability tends to be undesirably low and the practical value of the hollow-fiber ultrafiltration membrane may be reduced. However, when the permeability exceeds that range, the removal ratio of the target substances may be reduced.

There is no limitation to the method for producing the hollow-fiber ultrafiltration membrane of the present invention. As an example of a preferable method, a hydrophobic polymer, a hydrophilic polymer, a solvent and a non-solvent are dissolved into a mixture. The defoamed mixture is used as a membrane-production solution and discharged simultaneously with a core liquid from the annular and central portions, respectively, of a double pipe nozzle. The liquids are led through an air gap into a coagulation bath to form (using the dry-wet spinning method) a hollow-fiber ultrafiltration membrane, then washed, wound, and dried.

Examples of solvents usable in the membrane-production solution include N-methyl-2-pyrrolidone (hereunder referred to as NMP), N,N-dimethylformamide (hereunder referred to as DMF), N,N-dimethylacetamide (hereunder referred to as DMAc), dimethyl sulfoxide (hereunder referred to as DMSO) and ε-caprolactam. A wide range of solvents can be used as long as they are good solvents for the hydrophobic polymer and hydrophilic polymer used. When PSf, PES and like polysulfone-based polymers are used as the hydrophobic polymer, NMP, DMF, DMAc and like amide-based aprotic solvents are preferable, and NMP is particularly preferable. These solvents tend to make it easier to obtain a hollow fiber separation membrane having excellent permeability and fractionation performance as well as excellent retention and recovery of membrane separation characteristics. In the present invention, an amide-based solvent means a solvent having an amide bond in the structure, and an aprotic solvent means a solvent that does not contain a hydrogen atom directly bonded to a hetero atom in the structure.

Non-solvents of the aforementioned hydrophobic polymers may be added to the membrane-production solution. Examples of usable non-solvents include ethylene glycol, propylene glycol, diethylene glycol (hereunder referred to as DEG), triethylene glycol (hereunder referred to as TEG), polyethylene glycol (hereunder referred to as PEG), glycerol and water. When PSf, PES or a like polysulfone-based polymer is used as the hydrophobic polymer and PVP is used as the hydrophilic polymer, DEG, TEG, PEG or like ether polyols are preferable and TEG is particularly preferable. By using these non-solvents, a hollow-fiber separation membrane exhibiting excellent permeability and fraction performance as well as excellent retention and recovery of membrane separation characteristics can be relatively easily obtained. In the present invention, etherpolyol means a substance that has at least one ether bond and two or more hydroxyl groups in its structure.

The detailed mechanism is unknown; however, when a membrane-production stock solution prepared using these solvents and non-solvents is used, phase separation (coagulation) during spinning can be controlled. This is presumably advantageous in obtaining the preferable membrane structure of the present invention. Note that, the chemical constituent ratio of the core liquid and that of the liquid used in a coagulation bath (external coagulation liquid) described later are also important in controlling the phase separation.

There is no limitation to the concentration of the hydrophobic polymer in the membrane-production stock solution as long as a membrane can be formed using the stock solution. The concentration of the hydrophobic polymer in the membrane-production stock solution is preferably 10 to 35 weight %, more preferably 10 to 30 weight %, and still more preferably 15 to 25 weight %. A low concentration of hydrophobic polymer is preferable for attaining high permeability. However, if the concentration of the hydrophobic polymer is unduly low, the strength of the hollow-fiber ultrafiltration membrane may be lowered, or the fractionation characteristics may be worsened. There is no particular limitation to the amount of the hydrophilic polymer as long as it is sufficient to render hydrophilicity to the hollow-fiber ultrafiltration membrane and to suppress the chemical adhesion of fouling substances when treating an aqueous fluid. The ratio of the hydrophilic polymer to the hydrophobic polymer is preferably 10 to 30 weight %, and more preferably 10 to 20 weight %. If the amount of the hydrophilic polymer is less than the aforementioned ranges, application of hydrophilicity to the membrane becomes insufficient, resulting in a tendency to lower the retention of membrane separation characteristics. In contrast, if the amount of the hydrophilic polymer exceeds the aforementioned ranges, the effect of hydrophilicity application becomes saturated. This does not contribute to further improvement in the anti-fouling substance adhesion effect, but rather tends to cause the phase separation in the membrane-production stock solution to proceed excessively, which is disadvantageous for obtaining the preferred membrane structure of the present invention.

The ratio of solvent to non-solvent in the membrane-production stock solution is an important factor in controlling phase separation during the spinning step. More specifically, the solvent/non-solvent ratio in weight is preferably 30/70 to 70/30, more preferably 35/65 to 60/40, and still more preferably 35/65 to 55/45. If the solvent content is less than that range, coagulation tends to easily proceed, so that the membrane structure becomes too dense and permeability may be lowered. If the solvent content exceeds that range, a so-called delayed phase separation is often observed. This tends to cause the formation of macro voids in the membrane profile, and increases the risk of lowering the fractionation characteristics or reducing strength.

A membrane-production stock solution can be prepared by mixing a hydrophobic polymer, a hydrophilic polymer, a solvent and a non-solvent, followed by stirring to dissolve them. Here, the mixture can be efficiently dissolved by appropriately applying heat; however, applying excessive heat should be avoided since this may cause thermal decomposition of the components of the membrane-production stock solution. Furthermore, when a material that is easily decomposed by oxygen in the air, such as PVP, is used as a component of the membrane-production stock solution, it is preferable that dissolution of the spinning solution be conducted in an inert gas-filled condition. Examples of inert gases include nitrogen and argon. Among these, nitrogen is preferable because it is easily available at low cost. In this case, the concentration of the oxygen remaining in the dissolution tank preferably does not exceed 3%.

As an example of a method for producing the hollow-fiber ultrafiltration membrane of the present invention, the membrane-production stock solution is discharged from a double pipe nozzle simultaneously with a core liquid. There is no limitation to the temperature of the nozzle as long as it is the same or above the dissolution temperature of the membrane-production stock solution. For example, when the membrane material is PES, the temperature is preferably 90 to 30° C., and more preferably 80 to 40° C.

A preferable example of a method for producing the hollow-fiber ultrafiltration membrane of the present invention is a dry-wet spinning method, wherein a membrane-production stock solution is discharged from a double pipe nozzle simultaneously with a core liquid, and led into a coagulation bath that is filled with an external coagulation liquid, through an air gap. In this method, the retention time of the membrane-production stock solution, which was discharged from the nozzle, in the air gap may be a significant factor that greatly affects the membrane structure. If the retention time in the air gap is too short, the membrane-production stock solution is rapidly cooled and solidified by the external coagulation liquid without the agglomerated particles being sufficiently grown by phase separation in the air gap. This may result in a dense outer surface and tend to decrease permeability. Furthermore, the hollow-fiber ultrafiltration membranes thus formed tend to adhere to each other due to their dense outer surfaces. If the retention time in the air gap is too long, the resulting membrane is apt to have pores with large diameters, thus lowering the fractionation characteristics and strength. The retention time in the air gap is preferably within the range of 0.01 to 4 seconds and more preferably from 0.05 to 3 seconds.

The concentration of the solidifying liquid that contacts the membrane surface after the membrane-production stock solution is discharged from the nozzle is a significant factor in controlling the specific surface area and arithmetical-mean surface roughness. A hollow-fiber ultrafiltration membrane having a desirable specific surface area and/or arithmetical-mean surface roughness can be obtained by controlling the concentration of the external coagulation liquid when the raw water is supplied to the outer surface of the hollow-fiber ultrafiltration membrane, and the concentration of the core liquid when the raw water is supplied to the bore side of the hollow-fiber ultrafiltration membrane. In particular, when internal pressure type filtration, in which the raw water is supplied to the bore side of the hollow-fiber ultrafiltration membrane, is conducted, a hollow-fiber ultrafiltration membrane having a dense layer on the inner side thereof is preferable, since such a structure increases the shear velocity in the vicinity of the inner surface of the membrane and suppresses the deposition of fouling substances. When the concentration of the solvent contained in the core liquid situated on the inner surface side is raised, the exchange of solvent and non-solvent conducted between the membrane-production stock solution and the core liquid becomes slow. This may make the membrane surface rough, thus making the specific surface area and/or the arithmetical-mean surface roughness excessively large. In contrast, when the concentration of the solvent contained in the core liquid situated on the inner face side is too low, the exchange of solvent and non solvent conducted between the membrane-production stock solution and the core liquid becomes excessively rapid, and the pore structure in the membrane surface may not grow, thus making the specific surface area and/or the arithmetical-mean surface roughness excessively small and lowering permeability. It is preferable to use, as the core liquid, a mixture of water and the same solvent and non-solvent that are contained in the membrane-production stock solution. This readily simplifies the membrane-production step for the hollow-fiber ultrafiltration membrane. In this case, it is preferable to make the ratio of the solvent to the non-solvent contained in the core liquid the same as that in the membrane-production stock solution in order to further simplify the membrane-production step for the hollow-fiber ultrafiltration membrane. The core liquid concentration is defined as the proportion of the solvent and non solvent in the total weight of the solvent, non solvent and water mixture. The core liquid concentration is preferably 62 to 78 weight %, and more preferably 65 to 75 weight %.

In order to simplify the step of producing the membrane for the hollow-fiber ultrafiltration membrane, it is preferable to use, as the external coagulation liquid, a mixture of water and the same solvent and non-solvent that are contained in the membrane-production stock solution. Here, it is preferable to make the ratio of the solvent to the non solvent contained in the external coagulation liquid the same as that in the membrane-production stock solution. A preferable external coagulation liquid can be obtained by mixing the same solvent and non-solvent contained in the membrane-production stock solution at the same ratio as that in the membrane-production stock solution, and adding water thereto to dilute the mixture. The concentration of the external coagulation liquid is defined in the same manner as the core liquid concentration. The concentration of the external coagulation liquid is preferably 15 to 70 weight %, and more preferably 20 to 60 weight %. If the external coagulation liquid concentration is too low, coagulation tends to easily proceed, so that the membrane structure becomes too dense and permeability may be lowered. If the external coagulation liquid concentration exceeds 70 weight %, pores with large diameters are easily formed in the outer surface, increasing the risk of lowering the fractionation characteristics and strength. If the temperature of the external coagulation liquid is too low, the coagulation tends to easily proceed, so that the membrane structure becomes too dense and permeability may be lowered. However, if the temperature of the external coagulation liquid is too high, pores with large diameters are easily formed, increasing the risk of lowering the fractionation characteristics and strength. The temperature of the external coagulation liquid is preferably 30 to 80° C., and more preferably 40 to 70° C.

As described above, a hollow-fiber ultrafiltration membrane that passes through an air gap with a comparatively short retention time and is led into the coagulation bath comes into contact with an external coagulation liquid that has a comparatively mild coagulating property, with coagulation proceeding from the core liquid while external coagulation is relatively suppressed. More specifically, the structure of the hollow-fiber ultrafiltration membrane is not yet completely fixed immediately after it enters the coagulation bath. Rather, the hollow-fiber ultrafiltration membrane is completely solidified in the coagulation bath and the structure thereof is fixed, and then the hollow-fiber ultrafiltration membrane is wound. Again, as described above, the external coagulation liquid has a relatively mild coagulating property; therefore, it is necessary to ensure that the hollow-fiber ultrafiltration membrane is retained in the coagulation bath long enough to be completely solidified. Specifically, the retention time is preferably 2 to 20 seconds, and more preferably 5 to 20 seconds. A retention time in the coagulation bath that is shorter than these ranges will result in insufficient coagulation, thus lowering the spinning ability, as evidenced, for example, by fiber breakage, or causing the pore structure to roughen. If the retention time is longer than these ranges, the membrane production speed will be lowered or a large coagulation bath will be necessary, thus causing disadvantages for the production process.

The preferable structure of the hollow-fiber ultrafiltration membrane of the present invention is such that the membrane surface on the side to which raw water is supplied has a specific surface area within a predetermined range; the inner surface and the outer surface each has a dense layer; the pore size in the inner surface is smaller than that in the outer surface; the porosity initially increases from the inner surface toward the outer surface, and the porosity becomes smaller towards the outer surface after at least one extremely large portion is passed through. A preferable method for obtaining such a structure is that the hollow-fiber ultrafiltration membrane is produced under the spinning conditions describe above using the aforementioned membrane-production stock solution. In order to obtain an asymmetric structure in which the membrane has a high-low-high density distribution as viewed from the inner surface toward the outer surface, a balance should be struck between coagulation (mainly phase separation/coagulation by the core liquid) from the inner side of the hollow-fiber ultrafiltration membrane and coagulation (mainly air gap and phase separation/coagulation by the external coagulation liquid) from the outer side, so that the balance thereof serves to control the coagulation from both the inner surface and the outer surface toward the membrane wall interior. The factors that contribute to effective control of this coagulation are the chemical constituent ratio of the core liquid, the chemical constituent ratio and temperature of the external coagulation liquid, the retention time in the air gap, and the retention time in the coagulation bath, as described above. By setting these factors within the aforementioned ranges, a membrane structure having the features of the present invention can be obtained.

In order to obtain the hollow-fiber ultrafiltration membrane of the present invention, subtle control is required in coagulation from both the outer and inner surfaces. Here, attention has to be paid to the bending of the hollow-fiber ultrafiltration membrane in the coagulation bath. In dry-wet spinning, a membrane-production stock solution is generally discharged in the gravity direction from downwardly arranged nozzles, and led into a coagulation bath after passing through an air gap. The traveling direction thereof is then changed to upward or an upward slant in the coagulation bath, and the resulting membrane is then pulled from the coagulation bath, washed with water, and then wound. The structure of the hollow-fiber ultrafiltration membrane of the present invention is not completely solidified immediately after entering the coagulation bath. A drastic change in the traveling direction of the separation membrane before complete coagulation is not preferable, as this may result in defects or breaking of the membrane structure. More specifically, the curving radius in changing the travelling direction is preferably 20 to 300 mm, and more preferably 30 to 200 mm. Another example of a preferable method is the use of a multipoint guide to gradually change the direction at a plurality of points.

In the production of the hollow-fiber ultrafiltration membrane of the present invention, it is preferable that the hollow-fiber ultrafiltration membrane be substantially free from stretching until the hollow-fiber ultrafiltration membrane structure is completely solidified. Making it substantially free from stretching refers to controlling the speed of the rollers during the spinning step so that the spinning solution discharged from the nozzle is free from slackness or excessive tension. When the linear velocity for the discharge is defined as the value obtained by dividing the discharged amount by the sectional area of the nozzle, the ratio of the linear velocity for the discharge/speed of the first roller in the coagulation bath (the draft ratio) is preferably 0.7 to 1.8. When the draft ratio is less than 0.7, slackness is generated in the travelling hollow-fiber ultrafiltration membrane and productivity may be lowered. Therefore, the draft ratio is preferably not less than 0.8, more preferably not less than 0.9, and still more preferably not less than 0.95. When the draft ratio exceeds 1.8, the membrane structure may break; for example, the dense layer in the hollow-fiber ultrafiltration membrane may be torn. Accordingly, the draft ratio is more preferably not greater than 1.7, still more preferably not greater than 1.6, yet still more preferably not greater than 1.5, and even more preferably not greater than 1.4. By setting the draft ratio within that range, the deformation or breaking of pores can be prevented, and excellent retention of the membrane performance and sharp fractionation characteristics can be exhibited.

There is no particular limitation to the speed (spinning speed) of the membrane production as long as a hollow-fiber ultrafiltration membrane free from defects can be obtained and its productivity can be ensured; however, the spinning speed is preferably within the range of from 5 to 200 m/min. If the spinning speed is slower than that range, productivity may be lowered. If the spinning speed is faster than that range, it becomes difficult to ensure the aforementioned spinning conditions, especially the retention time in the air gap and the retention time in the coagulation bath.

It is preferable that a heat treatment be applied to the hollow-fiber ultrafiltration membrane that was obtained by winding the formed membrane after washing it in a water bath so that changes in the membrane separation characteristics during use or in cleaning operations can be suppressed, and desirable retention, stability and recovery of the membrane separation characteristics can be secured. If the heat treatment is conducted by dipping the membrane in hot water, the solvent, non-solvent and other components remaining in the hollow-fiber ultrafiltration membrane can be washed off or removed at the same time. It is more preferable to remove organic solvent that remains in the hollow-fiber ultrafiltration membrane to some extent before conducting the hot water immersion treatment. If the hollow-fiber ultrafiltration membrane is subjected to a hot water immersion treatment with organic solvent remaining at a high concentration therein, the dissolution of the membrane structure or a remarkable deterioration in water permeability may be observed. In this case, the specific surface area and arithmetical-mean roughness in the membrane surface will be simultaneously decreased. The concentration of the organic solvent remaining in the hollow-fiber ultrafiltration membrane when the hot water immersion treatment is conducted is preferably not greater than 400 mg/g, more preferably not greater than 300 mg/g, and still more preferably not greater than 150 mg/g. Cold water immersion is an example of a method for removing solvent that remains in the hollow-fiber ultrafiltration membrane. An effective alternative method is to cut the hollow-fiber ultrafiltration membranes to form a bundle, then remove the liquid from the bore side of the hollow-fiber ultrafiltration membranes, and pass water through the bore side of the hollow-fiber ultrafiltration membrane.

The temperature of the hot water used in the hot water immersion treatment of the hollow-fiber ultrafiltration membrane is preferably 60 to 100° C., and more preferably 80 to 100° C. The immersion time is preferably 1 to 120 minutes, more preferably 5 to 90 minutes, and still more preferably 10 to 80 minutes. When the temperature is lower than these ranges and the immersion time is shorter than these ranges, thermal hysteresis in the hollow-fiber ultrafiltration membrane becomes insufficient, causing the risk of a decrease in the retention and stability of the membrane separation characteristics. This may result in an insufficient cleaning effect and increase the eluted substance. If the immersion time is longer than these ranges, productivity may be decreased as it takes a longer time for treatment. There is no particular limitation to the liquor ratio, i.e., the ratio of the hollow-fiber ultrafiltration membrane to hot water, as long as the hollow-fiber ultrafiltration membrane can be satisfactorily immersed therein.

After the membrane formation process and heat treatment are conducted, the hollow-fiber ultrafiltration membrane is finally completed by drying. Various methods that are commonly employed in this field, such as air drying, vacuum drying and hot-air drying, can be used. Microwave drying and the like are also applicable; however, hot-air drying is preferably used since it can efficiently dry a large amount of hollow-fiber ultrafiltration membranes using a simple apparatus. Changes in the membrane separation characteristics due to hot-air drying can be suppressed by conducting the aforementioned heat treatment prior to drying. There is no limitation to the temperature of the hot air supplied for the hot-air drying; however, it is preferably 40 to 100° C., and more preferably 50 to 80° C. When the temperature is lower than these ranges, it takes a long time to dry the membrane, but if the temperature is higher than these ranges, the energy cost necessary for generating the hot air increases. It is preferable that the temperature of the hot air be lower than the temperature of the aforementioned heat treatment using hot water.

EXAMPLES

Examples of the present invention are described below; however, the scope of the present invention is not limited to these Examples.

(Measurement of the Pure Water Permeation Rate (FR))

A bundle of the hollow-fiber ultrafiltration membranes was placed in a case, both membrane ends were fixed using polyurethane resin as an adhesive, then both ends were opened to obtain a test module. Pure water was passed therethrough by internal pressure type dead-end filtration at 0.05 MPa and 25° C. The amount of water passing through the membranes was converted into the permeation flux per day per 100 kPa of differential pressure between the membranes, and the value thus calculated was defined as the FR (unit: m/day/100 kPa).

(Measurement of the Removal Ratio of Polyethylene Glycol 200000 (RjPEG200K))

Polyethylene glycol 200000 (manufactured by Sigma-Aldrich Corporation, hereunder referred to as PEG200K) was dissolved in pure water so that its concentration became 0.5 g/L, thus obtaining raw water. The raw water was passed through the test module by internal pressure-type cross-flow filtration under the conditions of 0.05 MPa, 25° C. and a recovery rate of not greater than 1%. The removal ratio of PEG200K (RjPEG200K) was calculated based on the PEG200K concentration in the feed liquid (Cf) and that in the permeated liquid (Cp). Here, RjPEG200K (%) was defined as $(1-Cp/Cf) \times 100$.

(Measurement of the Arithmetical-Mean Surface Roughness (Ra) and Specific Surface Area (S Ratio) of the Membrane Surface)

The hollow-fiber ultrafiltration membrane was cut by a knife to expose the inner surface thereof, and fixed on a solid substrate with the inner surface facing upward. The hollow-fiber ultrafiltration membrane was placed in a Petri dish cell together with the solid substrate, and immersed in pure water, giving an AFM observation sample. A scanning probe microscope (E-Sweep, manufactured by SII NanoTechnology Inc.) was used as the AFM apparatus. A DF3 cantilever and a 20 µm-scanner were used in the observation. Using the dynamic force mode (DFM) as the observation mode and observing the membrane surface, the surface area S and the arithmetical-mean surface roughness Ra were measured in a square of 2 µm on a side. The specific surface area (S ratio) was obtained by dividing the surface area S measured using an AFM by the visual field area S1.

(Measurement of the Differential Pressure Increase Rate)

Humic acid (manufactured by Nacalai Tesque, Inc., 0.2 g) was added to 20 mL of a 1-mol/L sodium hydroxidean aqueous solution and dissolved by stirring for not less than 30 minutes. Pure water was added to dilute the solution in such a manner that the total amount became 2 L, followed by stirring for 30 minutes. Sulfuric acid was gently added thereto little by little to adjust the pH to 7, obtaining a 100-mg/L humic acid stock solution. The humic acid stock solution was diluted with pure water, obtaining a simulation raw water containing 4 mg/L of humic acid.

Using the test module described above, the simulation raw water was supplied by internal pressure dead-end filtration. The pressure of the supplied simulation raw water was controlled as required to maintain a flux of 2.5 m/day and positive filtration was conducted for 59 minutes. Thereafter, pure water was supplied from the outer surface of the membrane to conduct back washing at a flux of 15 m/day for 1 minute. The above operations were repeated and the change in the differential pressure among the membranes during the operations was recorded. The difference between the differential pressure among membranes when filtration was first started and that when filtration was restarted after 30 back washing cycles was defined as the differential pressure increase. The differential pressure increase thus obtained was converted into an average differential pressure increase rate per hour and used as an index for the anti-fouling performance (performance recovery). The temperature of the simulation raw water was kept at 25° C. during this operation.

(Measurement of the Residual Organic Solvent Content)

A predetermined amount of hollow-fiber ultrafiltration membrane (the amount in which the weight of the polymer when dried became about 1 g) was cut into pieces each having a length of about 1 cm, and reflux extraction was conducted for 5 hours using a Soxhlet extractor. Here, ethanol was used as the extractant. The ethanol containing organic solvent remaining therein after extraction was subjected to quantitative analysis using gas chromatography to obtain the total weight (A) of NMP and TEG. The hollow-fiber ultrafiltration membrane after extraction was dried for 15 hours using a 105° C. constant-temperature dryer, and the weight of the dried membrane (B) was measured using an electronic balance. The residual organic solvent content was calculated by the formula A/B (mg/g).

Example 1

Figure 1:
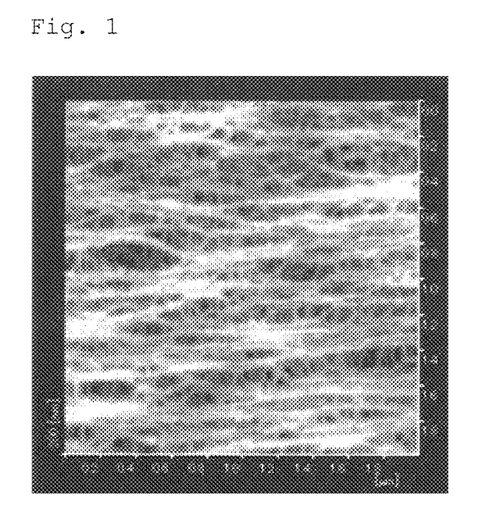
FIG. 1 is an AFM image showing the inner surface of the hollow-fiber ultrafiltration membrane of Example 1.

Commercially available PES (manufactured by Sumitomo Chemical Industries Ltd., 4800P, 20 parts by weight), PVP K-30 (manufactured by Nippon Shokubai Co., Ltd., 2.5 parts by weight), PVP K-90 (manufactured by Nippon Shokubai Co., Ltd., 0.5 parts by weight), NMP (manufactured by Mitsubishi Chemical Corporation, 34.7 parts by weight), and TEG (manufactured by Mitsui Chemicals, Inc., 42.3 parts by weight) were mixed and dissolved at 70° C. to obtain a homogeneous solution. A mixture of 31.5 parts by weight of NMP, 38.5 parts by weight of TEG and 30.0 parts by weight of water was separately prepared, and this solution was used as the core liquid. The aforementioned membrane-production stock solution was discharged from the annular portion of a double pipe nozzle, and the aforementioned core liquid was discharged from the central portion of the double pipe nozzle, and led through a 50-mm air gap, into a coagulation bath filled with an external coagulation liquid consisting of a mixture of 13.5 parts by weight of NMP, 16.5 parts by weight of TEG and 70.0 parts by weight of water. Here, the nozzle temperature was 75° C., and the external coagulation liquid temperature was 60° C. Subsequently, the membrane-production stock solution was treated in the coagulation bath, washed by water and then pulled up at a spinning speed of 12 m/min, obtaining a bundle of hollow fiber membranes. The bundle of hollow fiber membranes comprised 300 hollow fibers, with the ends of each fiber cut to make the fibers 1.3 m in length. The hollow portions of the fibers were thus opened, and the fibers were held vertically for 30 seconds to remove the liquid that remained in the hollow portions. The hollow portions were then washed by passing water through them at a flow rate of 5 L/min for 30 seconds per bundle of hollow fiber membranes. The weight of the residual organic solvent content remaining in the hollow fiber membrane after washing with water was 121 mg per 1 g of dry membrane. The bundle of hollow fiber membranes was dipped in water at 98° C. for 60 minutes, followed by hot-air drying at 50° C. for 15 hours. A dry hollow fiber membrane having an outer diameter of 1,300 µm, and a membrane thickness of 250 µm was thus obtained. The hollow fiber membrane thus obtained was evaluated and the results showed that the hollow fiber membrane had a pure water permeation rate FR of 32.3 m/day/100 kPa, an RjPEG200K of 74%, a differential pressure increase rate of 0.11 kPa/hr, a specific surface area (S ratio) of 1.33, and an arithmetical-mean roughness of 10.7 nm. Enlarging the cross sectional structure of the inner surface of the membrane by 10,000 times with a scanning electron microscope showed a dense layer on the inner surface and a mesh structure that continuously changed from a fine to a rough structure in the direction toward the interior of the membrane. FIG. 1 shows an AFM image of the inner surface of the hollow fiber membrane obtained in Example 1.

Example 2

Commercially available PES (manufactured by Sumitomo Chemical Industries Ltd., 4800P, 20 parts by weight), PVP K-30 (manufactured by Nippon Shokubai Co., Ltd., 3.0 parts by weight), NMP (manufactured by Mitsubishi Chemical Corporation, 34.7 parts by weight), TEG (manufactured by Mitsui Chemicals, Inc., 42.3 parts by weight) were mixed and dissolved at 70° C. to obtain a homogeneous solution. A mixture of 31.5 parts by weight of NMP, 38.5 parts by weight of TEG and 30.0 parts by weight of water was separately prepared, and this solution was used as the core liquid. The aforementioned membrane-production stock solution was discharged from the annular portion of a double pipe nozzle, and the aforementioned core liquid was discharged from the central portion of the double pipe nozzle, and led through a 50-mm air gap, into a coagulation bath filled with an external coagulation liquid consisting of a mixture of 13.5 parts by weight of NMP, 16.5 parts by weight of TEG and 70.0 parts by weight of water. Here, the nozzle temperature was 75° C., and the external coagulation liquid temperature was 60° C. Subsequently, the membrane-production stock solution was treated in the coagulation bath, washed by water and then pulled up at a spinning speed of 12 m/min, obtaining a bundle of hollow fiber membranes. The bundle of hollow fiber membranes comprised 300 hollow fibers, with the ends of each fiber cut to make the fibers 1.3 m in length. The hollow portions of the fibers were thus opened, and the fibers were held vertically for 30 seconds to remove the liquid that remained in the hollow portions. The hollow portions were then washed by passing water through them at a flow rate of 5 L/min for 30 seconds per bundle of hollow fiber membranes. The weight of the residual organic solvent content remaining in the hollow fiber membrane after washing with water was 98 mg per 1 g of dry membrane. The bundle of hollow fiber membranes was dipped in water at 98° C. for 60 minutes, followed by hot-air drying at 50° C. for 15 hours. A dry hollow fiber membrane having an outer diameter of 1,300 µm, and a membrane thickness of 250 µm was thus obtained. The hollow fiber membrane thus obtained was evaluated and the results showed that the hollow fiber membrane had a pure water permeation rate FR of 26.5 m/day/100 kPa, RjPEG200K of 85%, differential pressure increase rate of 0.14 kPa/hr, specific surface area (S ratio) of 1.47, and arithmetical-mean roughness of 10.8 nm.

Example 3

Commercially available PES (manufactured by Sumitomo Chemical Industries Ltd., 4800P, 21 parts by weight), PVP K-30 (manufactured by Nippon Shokubai Co., Ltd., 2.5 parts by weight), PVP K-90 (manufactured by Nippon Shokubai Co., Ltd., 0.5 parts by weight), NMP (manufactured by Mitsubishi Chemical Corporation, 34.2 parts by weight), TEG (manufactured by Mitsui Chemicals, Inc., 41.8 parts by weight) were mixed and dissolved at 70° C. to obtain a homogeneous solution. A mixture of 33.8 parts by weight of NMP, 41.2 parts by weight of TEG and 25.0 parts by weight of water was separately prepared, and this solution was used as the core liquid. The aforementioned membrane-production stock solution was discharged from the annular portion of a double pipe nozzle, and the aforementioned core liquid was discharged from the central portion of the double pipe nozzle, and led through a 50-mm air gap, into a coagulation bath filled with an external coagulation liquid consisting of a mixture of 13.5 parts by weight of NMP, 16.5 parts by weight of TEG and 70.0 parts by weight of water. Here, the nozzle temperature was 75° C., and the external coagulation liquid temperature was 60° C. Subsequently, the membrane-production stock solution was treated in the coagulation bath, washed by water and then pulled up at the spinning speed of 12 m/min, obtaining a bundle of hollow fiber membranes. The bundle of hollow fiber membranes comprised 300 hollow fibers, with the ends of each fiber cut to make the fibers 1.3 m in length. The hollow portions of the fibers were thus opened, and the fibers were held vertically for 30 seconds to remove the liquid that remained in the hollow portions. The hollow portions were then washed by passing water through them at a flow rate of 5 L/min for 30 seconds per bundle of hollow fiber membranes. The weight of the residual organic solvent content remaining in the hollow fiber membrane after washing with water was 163 mg per 1 g of dry membrane. The bundle of hollow fiber membranes was dipped in water at 98° C. for 60 minute, followed by hot-air drying at 50° C. for 15 hours. A dry hollow fiber membrane having an outer diameter of 1,300 µm, and a membrane thickness of 250 µm was thus obtained. The hollow fiber membrane thus obtained was evaluated and the results showed that the hollow fiber membrane had a pure water permeation rate FR of 33.6 m/day/100 kPa, RjPEG200K of 73%, differential pressure increase rate of 0.10 kPa/hr, specific surface area (S ratio) of 1.27, and arithmetical-mean roughness of 13.3 nm.

Example 4

Commercially available PES (manufactured by Sumitomo Chemical Industries Ltd., 4800P, 20 parts by weight), PVP K-30 (manufactured by Nippon Shokubai Co., Ltd., 3.0 parts by weight) NMP (manufactured by Mitsubishi Chemical Corporation, 34.7 parts by weight), TEG (manufactured by Mitsui Chemicals, Inc., 42.3 parts by weight) were mixed and dissolved at 70° C. to obtain a homogeneous solution. A mixture of 29.3 parts by weight of NMP, 35.7 parts by weight of TEG and 35.0 parts by weight of water was separately prepared, and this solution was used as the core liquid. The aforementioned membrane-production stock solution was discharged from the annular portion of a double pipe nozzle, and the aforementioned core liquid was discharged from the central portion of the double pipe nozzle, and led through a 50-mm air gap, into a coagulation bath filled with an external coagulation liquid consisting of a mixture of 13.5 parts by weight of NMP, 16.5 parts by weight of TEG and 70.0 parts by weight of water. Here, the nozzle temperature was 75° C., and the external coagulation liquid temperature was 60° C. Subsequently, the membrane-production stock solution were treated in the coagulation bath, washed by water and then pulled up at a spinning speed of 12 m/min, obtaining a bundle of hollow fiber membranes. The bundle of hollow fiber membranes comprised 300 hollow fibers, with the ends of each fiber cut to make the fibers 1.3 m in length. The hollow portions of the fibers were thus opened, and the fibers were held vertically for 30 seconds to remove the liquid that remained in the hollow portions. The hollow portions were then washed by passing water through them at a flow rate of 5 L/min for 30 seconds per bundle of hollow fiber membranes. The weight of the residual organic solvent content remaining in the hollow fiber membrane after washing with water was 113 mg per 1 g of dry membrane. The bundle of hollow fiber membranes was dipped in water at 98° C. for 60 minutes, followed by hot-air drying at 50° C. for 15 hours. A dry hollow fiber membrane having an outer diameter of 1,300 µm, and a membrane thickness of 250 µm was thus obtained. The hollow fiber membrane thus obtained was evaluated and the results showed that the hollow fiber membrane had a pure water permeation rate FR of 20.3 m/day/100 kPa, RjPEG200K of 71%, differential pressure increase rate of 0.10 kPa/hr, specific surface area (S ratio) of 1.19, and arithmetical-mean roughness of 7.6 nm.

Example 5

Commercially available PES (manufactured by Sumitomo Chemical Industries Ltd., 4800P, 21 parts by weight), PVP K-30 (manufactured by Nippon Shokubai Co., Ltd., 2.5 parts by weight), PVP K-90 (manufactured by Nippon Shokubai Co., Ltd., 0.5 parts by weight), NMP (manufactured by Mitsubishi Chemical Corporation, 34.2 parts by weight), TEG (manufactured by Mitsui Chemicals, Inc., 41.8 parts by weight) were mixed and dissolved at 70° C. to obtain a homogeneous solution. A mixture of 35.1 parts by weight of NMP, 42.9 parts by weight of TEG and 22.0 parts by weight of water was separately prepared, and this solution was used as the core liquid. The aforementioned membrane-production stock solution was discharged from the annular portion of a double pipe nozzle, and the aforementioned core liquid was discharged from the central portion of the double pipe nozzle, and led through a 50-mm air gap, into a coagulation bath filled with an external coagulation liquid consisting of a mixture of 13.5 parts by weight of NMP, 16.5 parts by weight of TEG and 70.0 parts by weight of water. Here, the nozzle temperature was 75° C., and the external coagulation liquid temperature was 60° C. Subsequently, the membrane-production stock solution was treated in the coagulation bath, washed by water and then pulled up at a spinning speed of 12 m/min, obtaining a bundle of hollow fiber membranes. The bundle of hollow fiber membranes comprised 300 hollow fibers, with the ends of each fiber cut to make the fibers 1.3 m in length. The hollow portions of the fibers were thus opened, and the fibers were held vertically for 30 seconds to remove the liquid that remained in the hollow portions. The hollow portions were then washed by passing water through them at a flow rate of 5 L/min for 30 seconds per bundle of hollow fiber membranes. The weight of the residual organic solvent content remaining in the hollow fiber membrane after washing with water was 142 mg per 1 g of dry membrane. The bundle of hollow fiber membranes was dipped in water at 98° C. for 60 minutes, followed by hot-air drying at 50° C. for 15 hours. A dry hollow fiber membrane having an outer diameter of 1,300 µm, and a membrane thickness of 250 µm was thus obtained. The hollow fiber membrane thus obtained was evaluated and the results showed that the hollow fiber membrane had a pure water permeation rate FR of 31.1 m/day/100 kPa, RjPEG200K of 70%, differential pressure increase rate of 0.19 kPa/hr, specific surface area (S ratio) of 1.49, and arithmetical-mean roughness of 14.6 nm.

Example 6

Commercially available PES (manufactured by Sumitomo Chemical Industries Ltd., 4800P, 20 parts by weight), PVP K-30 (manufactured by Nippon Shokubai Co., Ltd., 2.5 parts by weight), PVP K-90 (manufactured by Nippon Shokubai Co., Ltd., 0.5 parts by weight), NMP (manufactured by Mitsubishi Chemical Corporation, 34.7 parts by weight), TEG (manufactured by Mitsui Chemicals, Inc., 42.3 parts by weight) were mixed and dissolved at 70° C. to obtain a homogeneous solution. A mixture of 31.5 parts by weight of NMP, 38.5 parts by weight of TEG and 30.0 parts by weight of water was separately prepared, and this solution was used as the core liquid. The aforementioned membrane-production stock solution was discharged from the annular portion of a double pipe nozzle, and the aforementioned core liquid was discharged from the central portion of the double pipe nozzle, and led through a 50-mm air gap, into a coagulation bath filled with an external coagulation liquid consisting of a mixture of 13.5 parts by weight of NMP, 16.5 parts by weight of TEG and 70.0 parts by weight of water. Here, the nozzle temperature was 75° C., and the external coagulation liquid temperature was 60° C. Subsequently, the membrane-production stock solution was treated in the coagulation bath, washed by water and then pulled up at a spinning speed of 12 m/min, obtaining a bundle of hollow fiber membranes. The bundle of hollow fiber membranes comprised 300 hollow fibers, with the ends of each fiber cut to make the fibers 1.3 m in length. The hollow portions of the fibers were thus opened, and the fibers were held vertically for 30 seconds to remove the liquid that remained in the hollow portions. The hollow portions were then washed by passing water through them at a flow rate of 5 L/min for 15 seconds per bundle of hollow fiber membranes. The weight of the residual organic solvent content remaining in the hollow fiber membrane after washing with water was 268 mg per 1 g of dry membrane. The bundle of hollow fiber membranes was dipped in water at 98° C. for 60 minutes, followed by hot-air drying at 50° C. for 15 hours. A dry hollow fiber membrane having an outer diameter of 1,300 µm, and a membrane thickness of 250 µm was thus obtained. The hollow fiber membrane thus obtained was evaluated and the results showed that the hollow fiber membrane had a pure water permeation rate FR of 18.2 m/day/100 kPa, RjPEG200K of 77%, differential pressure increase rate of 0.12 kPa/hr, specific surface area (S ratio) of 1.13, and arithmetical-mean roughness of 5.2 nm.

Comparative Example 1

Figure 2:
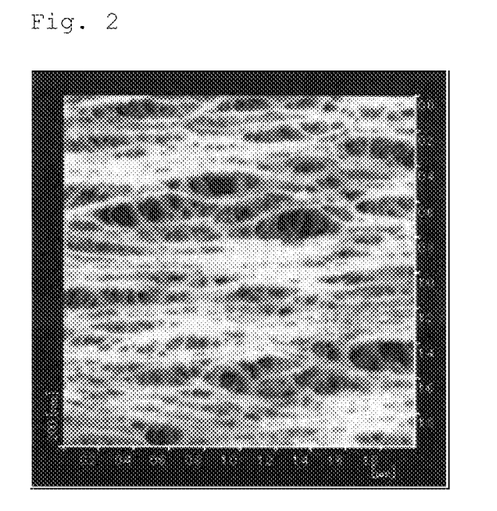
FIG. 2 is an AFM image showing the inner surface of the hollow-fiber ultrafiltration membrane of Comparative Example 1.

Commercially available PES (manufactured by Sumitomo Chemical Industries Ltd., 4800P, 21 parts by weight), PVP K-30 (manufactured by Nippon Shokubai Co., Ltd., 2.5 parts by weight), PVP K-90 (manufactured by Nippon Shokubai Co., Ltd., 0.5 parts by weight), NMP (manufactured by Mitsubishi Chemical Corporation, 34.2 parts by weight), TEG (manufactured by Mitsui Chemicals, Inc., 41.8 parts by weight) were mixed and dissolved at 70° C. to obtain a homogeneous solution. A mixture of 36.0 parts by weight of NMP, 44.0 parts by weight of TEG and 20.0 parts by weight of water was separately prepared, and this solution was used as the core liquid. The aforementioned membrane-production stock solution was discharged from the annular portion of a double pipe nozzle, and the aforementioned core liquid was discharged from the central portion of the double pipe nozzle, and led through a 50-mm air gap, into a coagulation bath filled with an external coagulation liquid consisting of a mixture of 13.5 parts by weight of NMP, 16.5 parts by weight of TEG and 70.0 parts by weight of water. Here, the nozzle temperature was 75° C., and the external coagulation liquid temperature was 60° C. Subsequently, the membrane-production stock solution was treated in the coagulation bath, washed by water and then pulled up at a spinning speed of 12 m/min, obtaining a bundle of hollow fiber membranes. The bundle of hollow fiber membranes comprised 300 hollow fibers, with the ends of each fiber cut to make the fibers 1.3 m in length. The hollow portions of the fibers were thus opened, and the fibers were held vertically for 30 seconds to remove the liquid that remained in the hollow portions. The hollow portions were then washed by passing water through them at a flow rate of 5 L/min for 30 seconds per bundle of hollow fiber membranes. The weight of the residual organic solvent content remaining in the hollow fiber membrane after washing with water was 192 mg per 1 g of dry membrane. The bundle of hollow fiber membranes was dipped in water at 98° C. for 60 minutes, followed by hot-air drying at 50° C. for 15 hours. A dry hollow fiber membrane having an outer diameter of 1,300 µm, and a membrane thickness of 250 µm was thus obtained. The hollow fiber membrane thus obtained was evaluated and the results showed that the hollow fiber membrane had a pure water permeation rate FR of 26.2 m/day/100 kPa, RjPEG200K of 66%, differential pressure increase rate of 0.57 kPa/hr, specific surface area (S ratio) of 1.60, and arithmetical-mean roughness of 18.6 nm. FIG. 2 shows the AFM image of the inner surface of the hollow fiber membrane obtained in Comparative Example 1.

Comparative Example 2

Commercially available PES (manufactured by Sumitomo Chemical Industries Ltd., 4800P, 22 parts by weight), PVP K-30 (manufactured by Nippon Shokubai Co., Ltd., 2.5 parts by weight), PVP K-90 (manufactured by Nippon Shokubai Co., Ltd., 0.5 parts by weight), NMP (manufactured by Mitsubishi Chemical Corporation, 33.8 parts by weight), TEG (manufactured by Mitsui Chemicals, Inc., 41.2 parts by weight) were mixed and dissolved at 70° C. to obtain a homogeneous solution. A mixture of 32.9 parts by weight of NMP, 40.1 parts by weight of TEG and 27.0 parts by weight of water was separately prepared, and this solution was used as the core liquid. The aforementioned membrane-production stock solution was discharged from the annular portion of a double pipe nozzle, and the aforementioned core liquid was discharged from the central portion of the double pipe nozzle, and led through a 50-mm air gap, into a coagulation bath filled with an external coagulation liquid consisting of a mixture of 13.5 parts by weight of NMP, 16.5 parts by weight of TEG and 70.0 parts by weight of water. Here, the nozzle temperature was 75° C., and the external coagulation liquid temperature was 60° C. Subsequently, the membrane-production stock solution was treated in the coagulation bath, washed by water and then pulled up at a spinning speed of 12 m/min, obtaining a bundle of hollow fiber membranes. The bundle of hollow fiber membranes comprised 300 hollow fibers, with the ends of each fiber cut to make the fibers 1.3 m in length. The hollow portions of the fibers were thus opened, and the fibers were held vertically for 30 seconds to remove the liquid that remained in the hollow portions. The hollow portions were then washed by passing water through them at a flow rate of 5 L/min for 30 seconds per bundle of hollow fiber membranes. The weight of the residual organic solvent content remaining in the hollow fiber membrane after washing with water was 130 mg per 1 g of dry membrane. The bundle of hollow fiber membranes was dipped in water at 98° C. for 60 minute, followed by hot-air drying at 50° C. for 15 hours. A dry hollow fiber membrane having an outer diameter of 1,300 μm, and a membrane thickness of 250 μm was thus obtained. The hollow fiber membrane thus obtained was evaluated and the results showed that the hollow fiber membrane had a pure water permeation rate FR of 28.9 m/day/100 kPa, RjPEG200K of 69%, differential pressure increase rate of 0.70 kPa/hr, specific surface area (S ratio) of 1.67, and arithmetical-mean roughness of 14.3 nm.

Comparative Example 3

Commercially available PES (manufactured by Sumitomo Chemical Industries Ltd., 4800P, 20 parts by weight), PVP K-30 (manufactured by Nippon Shokubai Co., Ltd., 1.0 part by weight), PVP K-90 (manufactured by Nippon Shokubai Co., Ltd., 2.0 parts by weight), NMP (manufactured by Mitsubishi Chemical Corporation, 34.7 parts by weight), TEG (manufactured by Mitsui Chemicals, Inc., 42.3 parts by weight) were mixed and dissolved at 70° C. to obtain a homogeneous solution. A mixture of 27.0 parts by weight of NMP, 33.0 parts by weight of TEG and 40.0 parts by weight of water was separately prepared, and this solution was used as the core liquid. The aforementioned membrane-production stock solution was discharged from the annular portion of a double pipe nozzle, and the aforementioned core liquid was discharged from the central portion of the double pipe nozzle, and led through a 50-mm air gap, into a coagulation bath filled with an external coagulation liquid consisting of a mixture of 13.5 parts by weight of NMP, 16.5 parts by weight of TEG and 70.0 parts by weight of water. Here, the nozzle temperature was 75° C., and the external coagulation liquid temperature was 60° C. Subsequently, the membrane-production stock solution was treated in the coagulation bath, washed by water and then pulled up at a spinning speed of 12 m/min, obtaining a bundle of hollow fiber membranes. The bundle of hollow fiber membranes comprised 300 hollow fibers, with the ends of each fiber cut to make the fibers 1.3 m in length. The hollow portions of the fibers were thus opened, and the fibers were held vertically for 30 seconds to remove the liquid that remained in the hollow portions. The hollow portions were then washed by passing water through them at a flow rate of 5 L/min for 30 seconds per bundle of hollow fiber membranes. The weight of the residual organic solvent content remaining in the hollow fiber membrane after washing with water was 93 mg per 1 g of dry membrane. The bundle of hollow fiber membranes was dipped in water at 98° C. for 60 minute, followed by hot-air drying at 50° C. for 15 hours. A dry hollow fiber membrane having an outer diameter of 1,300 μm, and a membrane thickness of 250 μm was thus obtained. The hollow fiber membrane thus obtained was evaluated and the results showed that the hollow fiber membrane had a pure water permeation rate FR of 2.3 m/day/100 kPa, RjPEG200K of 94%, differential pressure increase rate of 0.10 kPa/hr, specific surface area (S ratio) of 1.08, and arithmetical-mean roughness of 9.2 nm.

Comparative Example 4

Commercially available PES (manufactured by Sumitomo Chemical Industries Ltd., 4800P, 20 parts by weight), PVP K-30 (manufactured by Nippon Shokubai Co., Ltd., 2.5 parts by weight), PVP K-90 (manufactured by Nippon Shokubai Co., Ltd., 0.5 parts by weight), NMP (manufactured by Mitsubishi Chemical Corporation, 34.7 parts by weight), and TEG (manufactured by Mitsui Chemicals, Inc., 42.3 parts by weight) were mixed and dissolved at 70° C. to obtain a homogeneous solution. A mixture of 31.5 parts by weight of NMP, 38.5 parts by weight of TEG and 30.0 parts by weight of water was separately prepared, and this solution was used as the core liquid. The aforementioned membrane-production stock solution was discharged from the annular portion of a double pipe nozzle, and the aforementioned core liquid was discharged from the central portion of the double pipe nozzle, and led through a 50-mm air gap into a coagulation bath filled with an external coagulation liquid consisting of a mixture of 13.5 parts by weight of NMP, 16.5 parts by weight of TEG and 70.0 parts by weight of water. Here, the nozzle temperature was 75° C., and the external coagulation liquid temperature was 60° C. Subsequently, the membrane-production stock solution was treated in the coagulation bath, washed by water and then pulled up at a spinning speed of 12 m/min, obtaining a bundle of hollow fiber membranes. The bundle of hollow fiber membranes comprised 300 hollow fibers, with the ends of each fiber cut to make the fibers 1.3 m in length. The hollow portions of the fibers were thus opened, and the fibers were held vertically for 30 seconds to remove the liquid that remained in the hollow portions, but were not washed with water. The weight of the residual organic solvent content remaining in the hollow fiber membrane after the removal of water was 1,750 mg per 1 g of dry membrane. The bundle of hollow fiber membranes was dipped in water at 98° C. for 60 minutes, followed by hot-air drying at 50° C. for 15 hours. A dry hollow fiber membrane having an outer diameter of 1,300 μm, and a membrane thickness of 250 μm was thus obtained. The hollow fiber membrane thus obtained was evaluated and the results showed that the hollow fiber membrane had a pure water permeation rate FR of 1.9 m/day/100 kPa, an RjPEG200K of 84%, a differential pressure increase rate of 0.10 kPa/hr, a specific surface area (S ratio) of 1.04, and an arithmetical-mean roughness of 2.0 nm. Enlarging the cross sectional structure of the inner surface of the membrane by 10,000 times with a scanning electron microscope showed that the portion corresponding to the dense layer on the inner surface had a smooth resin film-like foam and the framework of the mesh structure in the membrane that continued from the resin film-like portion had a structure similar to a hard candy that had been melted and then solidified, and the structure itself was rough.

Comparative Example 5

Commercially available PES (manufactured by Sumitomo Chemical Industries Ltd., 4800P, 20 parts by weight), PVP K-30 (manufactured by Nippon Shokubai Co., Ltd., 2.5 parts by weight), PVP K-90 (manufactured by Nippon Shokubai Co., Ltd., 0.5 parts by weight), NMP (manufactured by Mitsubishi Chemical Corporation, 34.7 parts by weight), TEG (manufactured by Mitsui Chemicals, Inc., 42.3 parts by weight) were mixed and dissolved at 70° C. to obtain a homogeneous solution. A mixture of 31.5 parts by weight of NMP, 38.5 parts by weight of TEG and 30.0 parts by weight of water was separately prepared, and this solution was used as the core liquid. The aforementioned membrane-production stock solution was discharged from the annular portion of a double pipe nozzle, and the aforementioned core liquid was discharged from the central portion of the double pipe nozzle, and led through a 50-mm air gap into a coagulation bath filled with an external coagulation liquid consisting of a mixture of 13.5 parts by weight of NMP, 16.5 parts by weight of TEG and 70.0 parts by weight of water. Here, the nozzle temperature was 75° C., and the external coagulation liquid temperature was 60° C. Subsequently, the membrane-production stock solution was treated in the coagulation bath, washed by water and then pulled up at a spinning speed of 12 m/min, obtaining a bundle of hollow fiber membranes. The bundle of hollow fiber membranes comprised 300 hollow fibers, with the ends of each fiber cut to make the fibers 1.3 m in length. The hollow portions of the fibers were thus opened, and the fibers were held vertically for 30 seconds to remove the liquid that remained in the hollow portions. The hollow portions were then washed by passing water through them at a flow rate of 5 L/min for 5 seconds per bundle of hollow fiber membrane. The weight of the residual organic solvent content remaining in the hollow fiber membrane after washing with water was 476 mg per 1 g of dry membrane. The bundle of hollow fiber membranes was dipped in water at 98° C. for 60 minute, followed by hot-air drying at 50° C. for 15 hours. A dry hollow fiber membrane having an outer diameter of 1,300 μm, and a membrane thickness of 250 μm was thus obtained. The hollow fiber membrane thus obtained was evaluated and the results showed that the hollow fiber membrane had a pure water permeation rate FR of FR of 1.9 m/day/100 kPa, RjPEG200K of 84%, differential pressure increase rate of 0.14 kPa/hr, specific surface area (S ratio) of 1.04, and arithmetical-mean roughness of 2.0 nm. Enlarging the cross sectional structure of the inner surface of the membrane by 10,000 times with a scanning electron microscope showed that the portion corresponding to the dense layer on the inner surface had a smooth resin film-like form and the framework of the mesh structure in the membrane that continued from the resin film-like portion had a structure similar to a hard candy that had been melted and then solidified, and the structure itself was rough.

Figure 3:
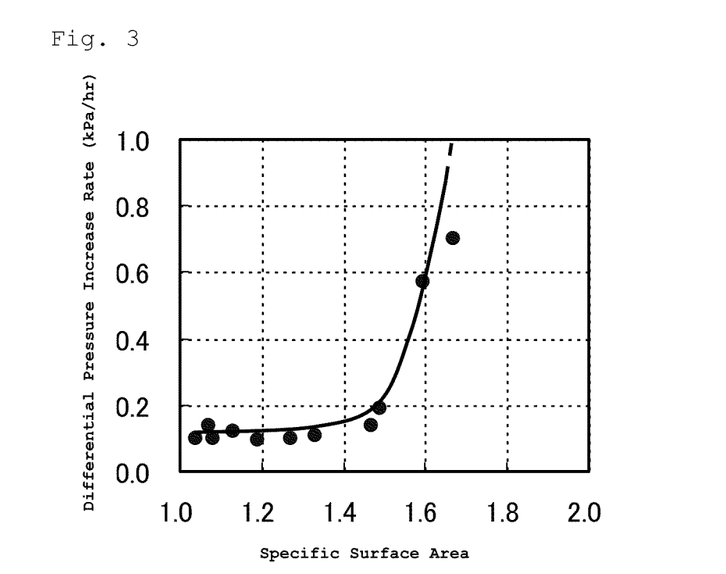
FIG. 3 is a graph showing the relationship between the specific surface area and the differential pressure increase rate in the hollow-fiber ultrafiltration membranes of the Examples and Comparative Examples.
Figure 4:
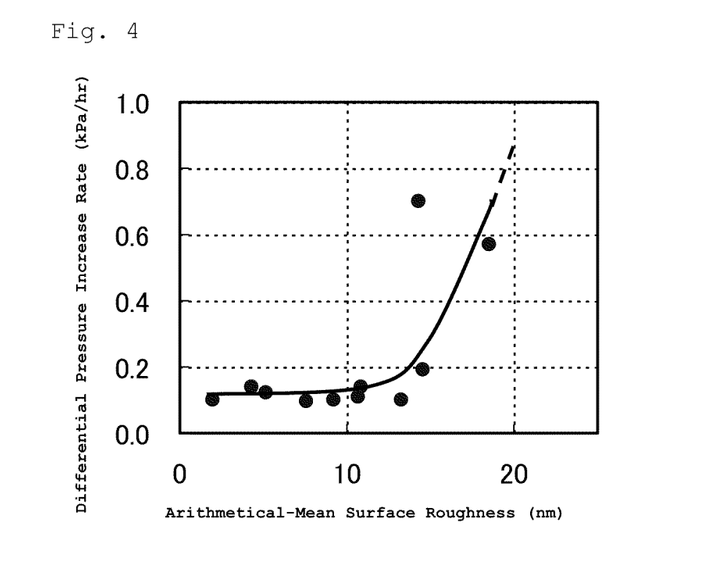
FIG. 4 is a graph showing the relationship between the arithmetical-mean surface roughness and the differential pressure increase rate in the hollow-fiber ultrafiltration membranes of the Examples and Comparative Examples.
Figure 5:
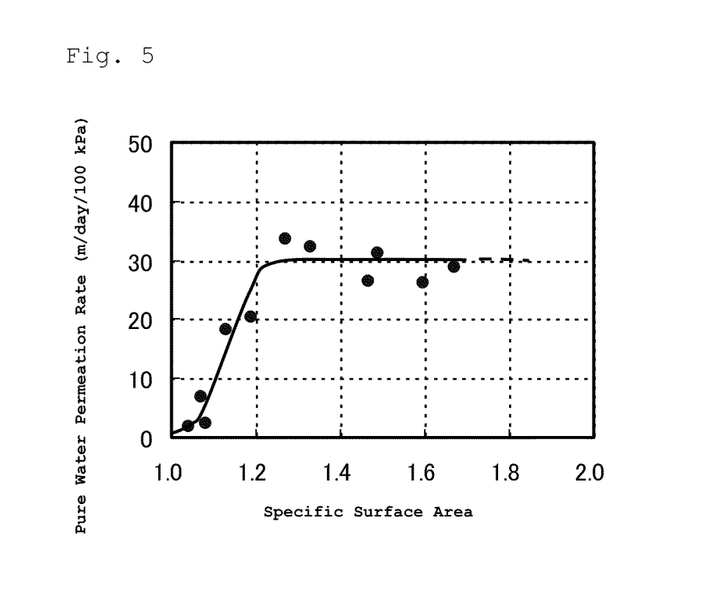
FIG. 5 is a graph showing the relationship between the specific surface area and the pure water permeation rate in the hollow-fiber ultrafiltration membranes of the Examples and Comparative Examples.
Figure 6:
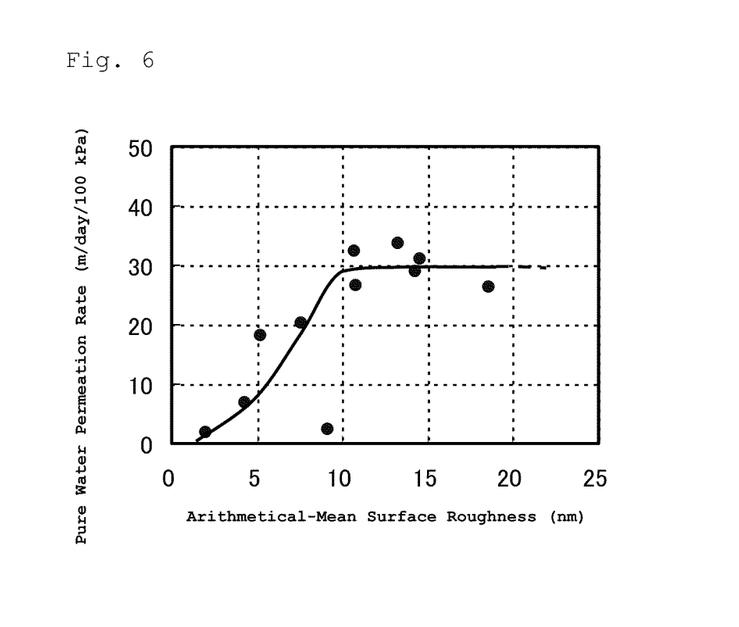
FIG. 6 is a graph showing the relationship between the arithmetical-mean surface roughness and the pure water permeation rate in the hollow-fiber ultrafiltration membranes of the Examples and Comparative Examples.

Table 1 and Table 2 show evaluation results of the hollow fiber membrane. FIG. 3 is a graph showing the relationship between the specific surface area and the differential pressure increase rate, FIG. 4 is a graph showing the relationship between the arithmetical-mean surface roughness and the differential pressure increase rate, FIG. 5 is a graph showing the relationship between the specific surface area and the pure water permeation rate, and FIG. 6 is a graph showing the relationship between the arithmetical-mean surface roughness and the pure water permeation rate.

TABLE 1

| | Components of membrane-production stock solution (weight %) | | | | | Components of core liquid (weight %) | | | Amount of organic solvent remaining (mg/g) |
|---|---|---|---|---|---|---|---|---|---|
| | PES | PVP K30 | PVP K90 | NMP | TEG | NMP | TEG | RO Water | |
| Example 1 | 20.0 | 2.5 | 0.5 | 34.7 | 42.3 | 31.5 | 38.5 | 30.0 | 121 |
| Example 2 | 20.0 | 3.0 | 0.0 | 34.7 | 42.3 | 31.5 | 38.5 | 30.0 | 98 |
| Example 3 | 21.0 | 2.5 | 0.5 | 34.2 | 41.8 | 33.8 | 41.2 | 25.0 | 163 |
| Example 4 | 20.0 | 3.0 | 0.0 | 34.7 | 42.3 | 29.3 | 35.7 | 35.0 | 113 |
| Example 5 | 21.0 | 2.5 | 0.5 | 34.2 | 41.8 | 35.1 | 42.9 | 22.0 | 142 |
| Example 6 | 20.0 | 2.5 | 0.5 | 34.7 | 42.3 | 31.5 | 38.5 | 30.0 | 268 |
| Comparative Example 1 | 21.0 | 2.5 | 0.5 | 34.2 | 41.8 | 36.0 | 44.0 | 20.0 | 192 |
| Comparative Example 2 | 22.0 | 2.5 | 0.5 | 33.8 | 41.2 | 32.9 | 40.1 | 27.0 | 130 |
| Comparative Example 3 | 20.0 | 1.0 | 2.0 | 34.7 | 42.3 | 27.0 | 33.0 | 40.0 | 93 |
| Comparative Example 4 | 20.0 | 2.5 | 0.5 | 34.7 | 42.3 | 31.5 | 38.5 | 30.0 | 1750 |
| Comparative Example 5 | 20.0 | 2.5 | 0.5 | 34.7 | 42.3 | 31.5 | 38.5 | 30.0 | 476 |

TABLE 2

| | Arithmetical-mean surface roughness Ra (nm) | Specific surface area S ratio (—) | Differential pressure increase rate (kPa/hr) | Membrane performance | | After evaluation of differential pressure increase rate | |
|---|---|---|---|---|---|---|---|
| | | | | FR (m/d/100 kPa) | Rj (%) | Rj (%) | Rj Change rate (%) |
| Example 1 | 10.7 | 1.33 | 0.11 | 32.3 | 74 | 75 | 1.4 |
| Example 2 | 10.8 | 1.47 | 0.14 | 26.5 | 85 | 87 | 2.4 |
| Example 3 | 13.3 | 1.27 | 0.10 | 33.6 | 73 | 73 | 0.0 |
| Example 4 | 7.6 | 1.20 | 0.10 | 20.3 | 71 | 70 | 1.4 |
| Example 5 | 14.6 | 1.49 | 0.19 | 31.1 | 70 | 72 | 2.9 |
| Example 6 | 5.2 | 1.13 | 0.12 | 18.2 | 77 | 80 | 3.9 |
| Comparative Example 1 | 18.6 | 1.60 | 0.57 | 26.2 | 66 | 72 | 9.1 |
| Comparative Example 2 | 14.3 | 1.67 | 0.70 | 28.9 | 69 | 81 | 17.4 |
| Comparative Example 3 | 9.2 | 1.08 | 0.10 | 2.3 | 94 | 94 | 0.0 |

TABLE 2-continued

| | Arithmetical-mean surface roughness | Specific surface area | Differential pressure increase | Membrane performance | | After evaluation of differential pressure increase rate | |
|---|---|---|---|---|---|---|---|
| | Ra (nm) | S ratio (—) | rate (kPa/hr) | FR (m/d/100 kPa) | Rj (%) | Rj (%) | Rj Change rate (%) |
| Comparative Example 4 | 2.0 | 1.04 | 0.10 | 1.9 | 84 | 85 | 1.2 |
| Comparative Example 5 | 4.3 | 1.07 | 0.14 | 6.8 | 83 | 85 | 2.4 |

As is clear from FIG. 3, when the specific surface area (S ratio) falls within the range of 1.10 to 1.55, the differential pressure increase rate is low and excellent anti-fouling performance is achieved. In contrast, when the specific surface area (S ratio) exceeds 1.55, the differential pressure increase rate rises remarkably and the anti-fouling performance is significantly lowered. As is also clear from FIG. 5, when the specific surface area (S ratio) falls within the range of 1.10 to 1.55, an excellent pure water permeation rate is obtained. In contrast, when the specific surface area (S ratio) is lower than 1.10, the pure water permeation rate is remarkably lowered; therefore, such a membrane is less practical.

Industrial Applicability

The hollow-fiber ultrafiltration membrane of the present invention can be used for removing bacteria, viruses, SS components and the like from water, while exhibiting stable membrane performance over a long period of time and remarkable membrane performance recovery by cleaning. Therefore, it can be used in various applications, such as the treatment of drinking water, sewage, and drain water.

The invention claimed is:

1. A hollow-fiber ultrafiltration membrane having a raw water supply side to which raw water is supplied, and having a specific surface area of not less than 1.10 and not greater than 1.55 with respect to the membrane surface on the raw water supply side to which raw water is supplied.

2. The hollow-fiber ultrafiltration membrane according to claim 1, which comprises hydrophobic and hydrophilic polymers.

3. The hollow-fiber ultrafiltration membrane according to claim 2, wherein the hydrophobic polymer contains polysulfone-based resin.

4. The hollow-fiber ultrafiltration membrane according to claim 2, wherein the hydrophilic polymer contains polyvinyl pyrrolidone.

5. The hollow-fiber ultrafiltration membrane according to claim 1, which has a pure water permeation rate of 5 to 300 m/d/100 kPa when measured at 25° C.

6. The hollow-fiber ultrafiltration membrane according to claim 1, which has a removal ratio of at least 70% for polyethylene glycol having a molecular weight of 200,000.

7. The hollow-fiber ultrafiltration membrane according to claim 1, which is used for membrane filtration of surface water, ground water, lake water or seawater.

8. The hollow-fiber membrane of claim 1, wherein the membrane is made by a method comprising a step of conducting a heat treatment under the conditions that the membrane has a residual organic solvent content of not greater than 300 mg/g of membrane, after conducting a membrane coagulation step.

* * * * *